Jan. 15, 1935.  G. E. NERNEY  1,987,701
EYEGLASS CONSTRUCTION
Filed Sept. 23, 1931  2 Sheets-Sheet 1

INVENTOR
George E. Nerney
BY ATTORNEYS

Jan. 15, 1935.  G. E. NERNEY  1,987,701
EYEGLASS CONSTRUCTION
Filed Sept. 23, 1931   2 Sheets-Sheet 2

INVENTOR
George E. Nerney
BY   ATTORNEYS

Patented Jan. 15, 1935

1,987,701

UNITED STATES PATENT OFFICE 1,987,701

EYEGLASS CONSTRUCTION

George E. Nerney, Attleboro, Mass., assignor to Bay State Optical Company, Attleboro, Mass., a corporation of Maine Application September 23, 1931, Serial No. 564,583

1 Claim. (Cl. 88—47)

This invention relates to an eyeglass construction.

One of the objects of this invention is to provide a simple and thoroughly practical eyeglass construction. Another object of this invention is to provide a device of the above character which will be of ready and inexpensive manufacture. Another object of this invention is to provide a device of the above character which will be durable and sturdy and at the same time pleasing in appearance. Another object of this invention is to provide a device of the above character which will be especially strong in certain vulnerable spots of common eyeglass constructions. Another object of this invention is to provide a device of the above character in which the possibility of loosening the bridge and temple connections is reduced to a minimum. Another object of this invention is to provide a device of the above character in which the lenses thereof are reliably supported in their proper position and the possibility of "lens sag" is reduced to a minimum. Another object of this invention is to provide a device of the above character free from encumbering connected parts at the sides of the lenses, thus facilitating sidewise vision while maintaining a high standard of durability. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claim.

In the accompanying drawings in which is shown one or more of the various possible embodiments of this invention, Figure 1 is a front elevation of an eyeglass frame, certain of the parts thereof being cut off;

Similar reference characters refer to similar parts throughout the several views of the drawings.

As conducive to a clearer understanding of certain features of this invention, it might here be pointed out that in certain eyeglass frames and, more particularly, in eyeglass frames of the "rimless" type, considerable difficulty has been experienced in making a firm connection between the lens and the bridge or temples. This difficulty is increased due to the fragile character of common lenses so that it is quite undesirable to employ a clamp or the like which exerts too great a pressure against the surface of the lenses. Due to the precarious nature of these connections, especially with respect to the bridge, it often happens that the lens becomes loosened from the connection and sags down from its normal position, this difficulty being referred to herein as "lens sag". Such sagging throws the lens out of line with respect to the eye and may become very dangerous to the wearer of the frame. One of the various objects of this invention is to provide an eyeglass frame or a pair of spectacles in which the above-mentioned difficulties, as well as many others, are successfully and efficiently overcome.

Figure 1:
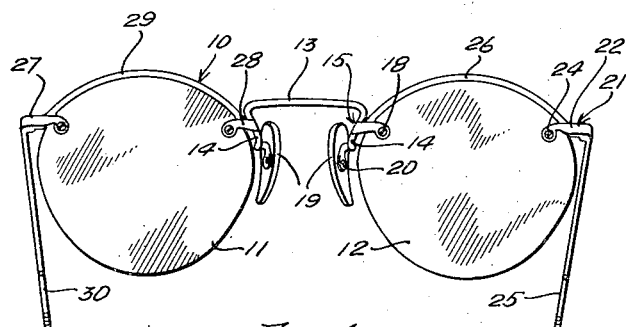

Referring now to Figure 1, there is shown an eyeglass frame generally indicated at 10 having two lenses 11 and 12, lenses 11 and 12 being connected by bridge 13 in a manner to be described hereinafter.

Figure 2:
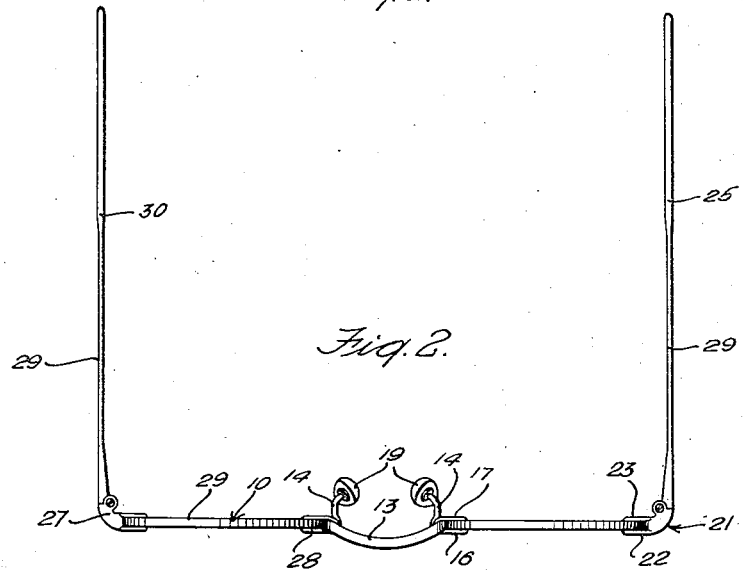
Figure 2 is a top plan view of the eyeglass frame shown in Figure 1.

One portion 14 of bridge 13 is bent downwardly substantially following the periphery of lens 12 but preferably out of contact therewith. Secured to portion 14 is a saddle generally indicated at 15 having two arms 16 and 17 extending along the opposite surfaces of lens 12 from the periphery thereof, as is best shown in Figure 2. Arms 16 and 17, which are preferably in registry with each other, extend along lens 12 at a point spaced above the transverse axis of lens 12, as viewed in Figure 1. The exterior ends of arms 16 and 17 are curved downwardly, as viewed in Figure 1, and extending through these ends and also through lens 12 I preferably provide a screw 18 preferably threaded into arm 17. In this manner, bridge 15 is firmly secured to lens 12 at a point spaced from the transverse axis thereof.

Portion 14 of bridge 13 extends downwardly, as viewed in Figure 1, from saddle 15 and thence rearwardly and inwardly so that a nose engaging member 19 of any desired character may be secured to its free end in any convenient manner as, for example, a loose socket joint 20. In this manner, portion 14 also acts as a guard for that portion of the periphery of lens 12 with which it is in registry.

Substantially at the side of lens 12 opposite bridge 13 is an endpiece generally indicated at 21 (Figures 1 and 2). Endpiece 21 is preferably formed in the shape of a saddle having two registering arms 22 and 23 extending along the opposite surface of lens 12 as best shown in Figures 1 and 2. The ends of arms 22 and 23 are curved downwardly, as viewed in Figures 1, 4 and 5, and I preferably provide a screw 24 passing through the end of arm 22, lens 12 thence to be threaded into arm 23. The point at which arms 22 and 23 of endpiece 21 are connected to lens 12 is also spaced from the transverse axis of lens 12 and preferably on a line with the point through which screw 18 passes. Thus, I prefer to position these parts so that a line drawn through the centers of screws 18 and 24 is substantially parallel to the transverse axis of the lens. Endpiece 21 extends outwardly and rearwardly to be connected in turn to a temple 25. Although the connection between temple 25 and endpiece 21 may be of any convenient form, I prefer to have a tongue extending from the end of the temple and fitted between two ears on the endpiece. Such a form of connection is described in detail in Letters Patent No. 1,613,765.

Extending from endpiece 21 to saddle 15 is a part 26 substantially following the periphery of lens 12. Part 26 is rigidly secured to endpiece 21 and preferably fits within and is connected to saddle 15. Thus, part 26 forms a portion of a rim for lens 12 extending along the top side thereof and preferably in substantial engagement therewith.

Inasmuch as the remaining portions of frame 10 on the opposite side thereof, as viewed in Figure 1, are substantially similar to those described above, they will not be described in detail herein. Thus, an endpiece 27 and a saddle 28 are connected to lens 11 at points substantially similar to the points at which endpiece 21 and saddle 15 are connected to lens 12, endpiece 27 carrying a temple 30. A part 29, substantially similar to part 26, connects endpiece 27 and saddle 28.

Figure 3:
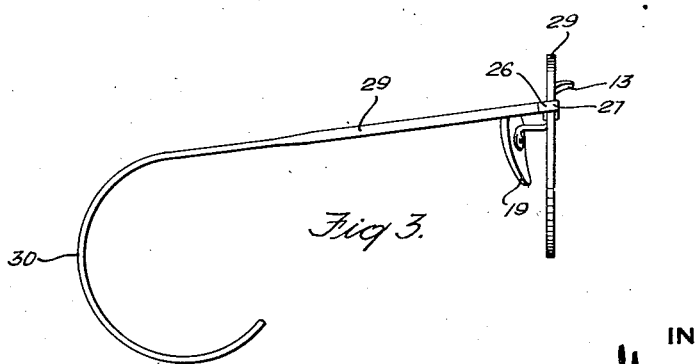
Figure 3 is a side elevation of the eyeglass frame shown in Figure 1.

Referring to Figure 3, endpiece 27 is bent downwardly, as viewed in this figure, thus at an acute angle to the plane surface of lens 11. Likewise, temple 30 also extends downwardly at an angle to the plane surface of the lens. The parts on both sides being substantially identical in structure, temple 25 is in substantial registry with temple 30, when viewed from the side, as seen in Figure 3.

It will now be seen that all parts of frame 10 connected to lenses 11 and 12 are at points spaced above the transverse axes thereof, as viewed in Figure 1. Furthermore, a line passing through the centers of the screws connecting endpiece 27 and saddle 28 to lens 11 as well as screws 18 and 24 is substantially parallel to the transverse axes of the lenses. By positioning the connected parts in such a manner, a very reliable connection is obtained between the bridge and lenses. This is partially due to the fact that the temple connections are on a line with the bridge connections and in this way the amount of leverage between these two connections is reduced to a minimum.

One of the most valuable advantages achieved by raising the temple connections above the transverse axis of the lens is the removal of any obstacle at the side of the eye so that a clear range of vision may be obtained in this direction. This advantage, as well as others, might be offset by the increased leverage created when the endpiece is so positioned and the bridge connecting point is positioned further down or substantially upon the transverse axis of the lens. By situating both of these points upon a line above the transverse axis, the leverage is diminished without sacrificing any of the advantages of the raised temple, and the reduction of such a strain on the bridge-lens connecting points likewise diminishes the possibility of loosening this connection with the resultant inconvenience of "lens sag", the nature of which has been described above.

Parts 26 and 29 serve to further increase the stability of the bridge and temple connecting points by acting as a support between the bridge and endpieces. Thus, these parts serve to support a portion of the weight of the lens, whereas in the common rimless construction the entire burden of this weight is usually borne by the bridge connection.

Considering the frame as a whole, it is often true that such frames are subjected to peculiar twisting action as, for example, when forces are exerted in opposite vertical directions upon the two temples, as viewed in Figure 1. Such a twisting action serves to loosen the connecting points and may result in breaking out the endpieces or the bridge connecting members from the lens. However, my frame is admirably adapted to withstand such shocks and stresses due to the bracing action of parts 26 and 29, as well as the position of the various connections described above.

While achieving the effect of a pair of rimless spectacles, it will now become clear that I also attain the sturdy characteristics and durability of spectacles having continuous rims about the periphery of the lenses. On the other hand, as there is nothing extending about the lenses below endpieces 21 and 27 (Figure 1) such as rims, for example, the line of vision of the wearer in a sidewise direction is unimpeded.

Figure 4:
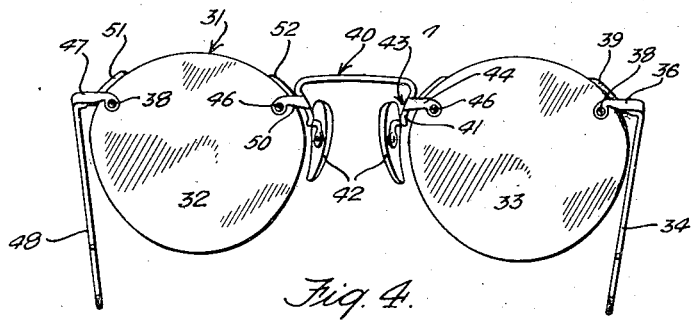
Figure 4 is a front elevation of a pair of spectacles in which another embodiment of my invention is included.
Figure 5:
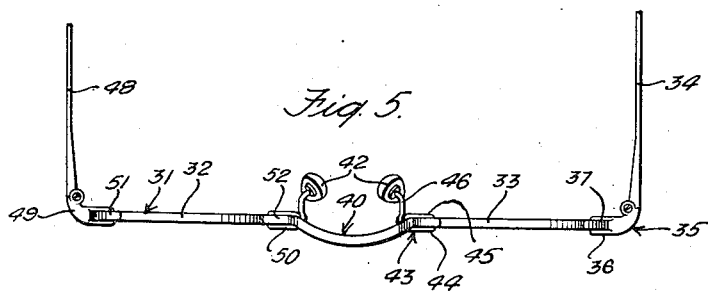
Figure 5 is a top plan view of the spectacles shown in Figure 4.

Turning now to Figure 4, there is shown a pair of spectacles of the rimless type generally indicated at 31, having lenses 32 and 33.

Figure 7:
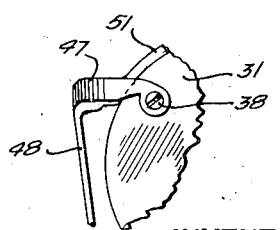
Figure 7 is an enlarged front elevation of certain portions of an eyeglass frame or spectacles such as those shown in the above figures.

A temple 34 is connected to lens 33 in a manner substantially similar to that described above, thus having its point of connection spaced above the transverse axis of the lens. More specifically, temple 34 is connected to an endpiece generally indicated at 35 having two arms 36 and 37 (Figure 5) extending inwardly in a left hand direction, as viewed in Figures 4 and 5, along the opposite surfaces of lens 33. The inner or left hand ends of arms 36 and 37 extend downwardly toward the transverse axis of lens 33 (Figure 7) and I preferably provide a screw 38 extending through arm 36 and lens 33 and threaded into arm 37. To add to the stability of this temple connection, I also provide a part 39 rigidly secured to endpiece 35 and extending along the top edge of lens 33 in substantial engagement therewith, as is more clearly shown in Figure 4. In this manner, temple 34 is reliably secured to lens 33 at a point spaced from the transverse axis thereof.

Lenses 32 and 33 are connected by a bridge 40 extending therebetween and having a portion 41 extending downwardly substantially following the contour of lens 33 for a certain distance, thence to extend rearwardly (Figure 5) and downwardly so that a nose engaging member 42 may be secured to its end in any convenient manner as, for example, by a loose socket joint as described above. Rigidly secured to portion 41 of bridge 40 is a saddle generally indicated at 43 having two arms 44 and 45 extending toward endpiece 35 and along the opposite surfaces of lens 33. The ends of arms 44 and 45 are curved downwardly toward the transverse axis of lens 33 and a screw 46 extends through arm 44, lens 33 to be threaded into arm 45. Furthermore, screw 46 is spaced above the transverse axis of lens 33 and preferably a line passing through the centers of screws 46 and 38 is substantially parallel to the transverse axis of the lens. Secured to saddle 43 is a part 47 extending along the upper edge of lens 33, as viewed in Figure 4, substantially toward endpiece 35 and preferably in engagement with the edge of the lens.

Figure 6:
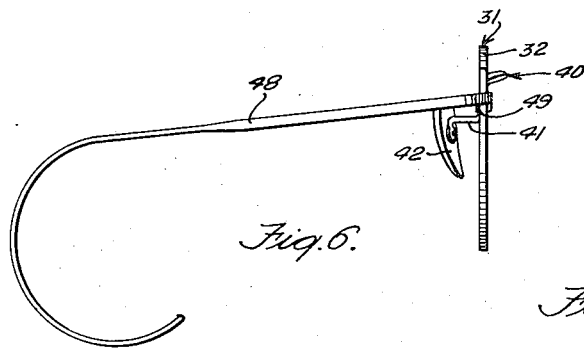
Figure 6 is a side elevation of the spectacles shown in Figure 4.

Inasmuch as the portions of spectacle frame 31 are substantially identical on each side, those parts connected to lens 32 will not be described in detail. These parts consist of a temple 48 connected to an endpiece 49 which is in turn connected to lens 32 at a point spaced from the transverse axis of lens 32. Bridge 40 is connected to lens 32 by a saddle 50 substantially similar in construction to saddle 43 above described. Also, parts 51 and 52 are rigidly connected to endpiece 49 and saddle 50, these parts being similar to parts 47 and 39. Furthermore, endpiece 49, saddle 50, saddle 43 and endpiece 35 are connected to lenses 32 and 33 preferably upon a line spaced above the transverse axes thereof and running parallel thereto. As is more clearly shown in Figure 6, the rear end or that end of endpiece 49 adjoining temple 48 is bent downwardly at an angle to the plane surface of lens 32 so that temple 48 also extends downwardly at such an angle, temple 34 being in substantial registry therewith. Such a construction is desirable in order that the temples may run from a raised portion on the lenses to the tops of the ears of the wearer.

The advantages of spectacle frame 31 have been described above with reference to the other embodiment of my invention, one of the most valuable of such advantages being that the leverage between the temple connection in a frame having a raised temple and the bridge connection is reduced materially and thus all connections in the frame are strengthened against possible breakage or loosening.

It will thus be seen that I have provided a thoroughly practical, efficient and durable device in which the several objects described above, as well as many others, have been successfully achieved.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

In eyeglass construction, in combination, a lens, a bridge, said bridge having a portion extending downwardly adjacent said lens, a saddle comprising a pair of members embracing said lens rigidly associated with said bridge, an endpiece, a second saddle also comprising a pair of members embracing said lens rigidly associated with said endpiece, said endpiece extending outwardly from said second-mentioned saddle, the corresponding members of each pair being in substantial alignment and extending above the transverse axis of the lens, the line passing through both said saddles and said endpiece being substantially parallel to the transverse axis of said lens, means holding each of said saddles in related assembly with said lens, and a part shaped to conform to the periphery of a portion of said lens positioned along the edge of said lens between the planes of the members of each of said pairs of members, said saddles and the ends of said parts being connected, the angular disposition of said part relative to said saddle members and in the transverse plane thereof being acute.

GEORGE E. NERNEY.